(12) United States Patent
Zheng et al.

(10) Patent No.: US 9,372,350 B2
(45) Date of Patent: Jun. 21, 2016

(54) CYLINDRICAL LENS ASSEMBLY AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Xiaoyi Zheng, Beijing (CN); Hongtao Lin, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/402,589

(22) PCT Filed: May 29, 2014

(86) PCT No.: PCT/CN2014/078761
§ 371 (c)(1),
(2) Date: Nov. 20, 2014

(87) PCT Pub. No.: WO2015/096389
PCT Pub. Date: Jul. 2, 2015

(65) Prior Publication Data
US 2015/0286062 A1    Oct. 8, 2015

(30) Foreign Application Priority Data

Dec. 26, 2013  (CN) .......................... 2013 1 0740189

(51) Int. Cl.
*G02B 3/12* (2006.01)
*G02B 3/00* (2006.01)
(Continued)

(52) U.S. Cl.
CPC ............ *G02B 27/2214* (2013.01); *G02B 3/005* (2013.01); *G02B 3/12* (2013.01);
(Continued)

(58) Field of Classification Search
CPC .... G02B 27/2214; G02B 3/005; G02B 27/22; G02B 3/10; H04N 13/0404; H04N 2013/0465; H04N 2013/0461; H04N 13/0445–13/0447; G02F 1/133526; G09G 2320/068

USPC ............ 349/57, 95; 359/455, 489.14, 489.18, 359/581, 619, 722, 463
See application file for complete search history.

(56) References Cited

U.S. PATENT DOCUMENTS 8,422,131 B2 *  4/2013  Kim ................... G02B 27/2214
                                                        348/59
2002/0036825 A1 *  3/2002  Lipton ............... G02B 27/2214
                                                        359/463
(Continued)

FOREIGN PATENT DOCUMENTS

CN      1568624 A      1/2005
CN      1834729 A      9/2006
(Continued)

OTHER PUBLICATIONS

Search Report issued in International Application No. PCT/CN2014/078761, thirteen (13) pages.
(Continued)

*Primary Examiner* — Paul Lee
*Assistant Examiner* — Jia Pan
(74) *Attorney, Agent, or Firm* — Nath Goldberg & Meyer; Joshua B. Goldberg; Christopher Thomas (57) ABSTRACT

The present invention provides a cylindrical lens assembly, comprising a cylindrical lens array, a closed hood and a liquid storage tank. A to-be-filled chamber is formed between the cylindrical lens array and the closed hood. The to-be-filled chamber is connected with the liquid storage tank used for storing transparent liquid. The refractive index of the transparent liquid is the same as that of the cylindrical lens array. The transparent liquid can flow between the liquid storage tank and the to-be-filled chamber and fill up the to-be-filled chamber. The top of the closed hood is made of a transparent material. The present invention further provides a display device comprising above cylindrical lens assembly. The cylindrical lens assembly provided by the present invention is simple and easy to operate, and the display device comprising above cylindrical lens assembly can realize a switchover between flat panel display and stereoscopic display, with low cost.

14 Claims, 6 Drawing Sheets

(51) Int. Cl.
*G02F 1/1335* (2006.01)
*G02B 27/22* (2006.01)
*H04N 13/04* (2006.01)
*G02B 26/08* (2006.01)
*G02B 13/14* (2006.01)

(52) U.S. Cl.
CPC ......... *G02B 26/08* (2013.01); *G02F 1/133526* (2013.01); *G02B 13/14* (2013.01); *H04N 13/0404* (2013.01); *H04N 2013/0465* (2013.01)

(56) References Cited

U.S. PATENT DOCUMENTS

| | | | | |
|---|---|---|---|---|
| 2003/0085850 A1* | 5/2003 | Feenstra | ............... | G02B 26/005 345/32 |
| 2010/0097449 A1* | 4/2010 | Jeong | ................ | G02B 27/2214 348/59 |
| 2013/0335649 A1 | 12/2013 | Mather et al. | | |

FOREIGN PATENT DOCUMENTS

| | | | |
|---|---|---|---|
| CN | 101713868 A | | 5/2010 |
| CN | 102193203 A | | 9/2011 |
| CN | 202073446 U | * | 12/2011 |
| CN | 103091854 A | | 5/2013 |
| CN | 103698890 A | | 4/2014 |
| CN | 103728678 A | | 4/2014 |
| JP | 0868961 A | | 3/1996 |
| JP | 08068961 A | * | 3/1996 |
| JP | 201315613 A | | 1/2013 |

OTHER PUBLICATIONS

Chinese First Office Action dated Dec. 22, 2014 corresponding to application No. 201310740189.3.

* cited by examiner

CYLINDRICAL LENS ASSEMBLY AND DISPLAY DEVICE

This is a National Phase Application filed under 35 U.S.C. 371 as a national stage of PCT/CN2014/078761, filed May 29, 2014, and claims priority benefit from Chinese Application No. 201310740189.3, filed Dec. 26, 2013, the content of each of which is hereby incorporated by reference in its entirety.

FIELD OF THE INVENTION

The present invention relates to the field of stereoscopic display technology, and particularly relates to a cylindrical lens assembly capable of realizing a switchover between flat panel display and stereoscopic display and a display device comprising the cylindrical lens assembly.

BACKGROUND OF THE INVENTION

Human beings sense the depth of an object through a subtle difference of the same object observed by left and right eyes, thus recognizing a stereoscopic image of the object. This difference is called parallax. The stereoscopic display technology is producing parallax of left and right eyes of an observer by artificial means and sending two parallactic images to the left and right eyes of the observer, so that the brain generates a real stereoscopic feeling after acquiring the two parallactic images observed by the left and right eyes.

To meet preferences of different users (some users expect to experience stereoscopic display effects, while some users expect to experience flat panel display effects), flat panel display/stereoscopic display switching mechanisms have been provided in some display devices and thus allow the display devices to show different display effects according to the selections of users.

In the prior art, a display device capable of realizing a switchover of flat panel display/stereoscopic display includes a display panel and a liquid crystal grating disposed on a light emergent side of the display panel. During the flat panel display, the liquid crystal grating is a light transmittable surface; and during the stereoscopic display, the liquid crystal grating is a plurality of light transmittable stripes and a plurality of shading stripes which are arranged at interval. The liquid crystal grating cooperates with the display panel to allow the left eye of a user to see a left-eye image only and the right eye to see a right-eye image only and there is a parallax between the left-eye image and the right-eye image, so that the stereoscopic display is realized. Although the switchover of flat panel display/stereoscopic display may be realized by the liquid crystal grating, yet the display device including the liquid crystal grating has complicated structure, relatively high cost, low utilization of a light source and high energy consumption.

In the prior art, there is also a display device for realizing the switchover of flat panel display/stereoscopic display by using a lens assembly. This lens assembly includes concave lenses and convex lenses fitting in with the concave lenses. Both the concave lenses and the convex lenses are made of a birefringent material. The refractive index of one of the concave lenses is equal to that of a corresponding one of the convex lenses; moreover, for a polarized light in a certain particular polarization direction, the concave lenses show an ordinary refractive index, while the convex lenses show an extraordinary refractive index. To realize a switchover between flat panel display and stereoscopic display, the display device also needs to be configured with a switchable polarizer. The switchable polarizer may be switched between a first polarization mode in which a first polarized component of light can pass through the polarizer and a second polarization mode in which a second polarized component of the light can pass through the polarizer. This display device including the lens assembly has relatively complicated structure and high cost.

Therefore, how to realize a switchover between flat panel display and stereoscopic display with a simple structure has become an urgent technical problem to be solved in the art.

SUMMARY OF THE INVENTION

An objective of the present invention is to provide a cylindrical lens assembly capable of realizing a switchover between flat panel display and stereoscopic display and a display device including the cylindrical lens assembly. The cylindrical lens assembly has a simple structure.

To achieve the above objective, as one aspect of the present invention, a cylindrical lens assembly is provided, comprising a cylindrical lens array, a closed hood and a liquid storage tank, wherein a to-be-filled chamber is formed between the cylindrical lens array and the closed hood, the to-be-filled chamber is connected with the liquid storage tank used for storing transparent liquid, the refractive index of the transparent liquid is the same as that of the cylindrical lens array, the transparent liquid can flow between the liquid storage tank and the to-be-filled chamber and can fill up the to-be-filled chamber, and the top of the closed hood is made of a transparent material.

Preferably, the cylindrical lens array comprises a plurality of convex lenses arranged in parallel, the orientations of convex surfaces of the plurality of convex lenses are consistent to form a convex surface of the cylindrical lens array, the closed hood comprises a transparent top wall, a side wall connected to the top wall and an opening opposite to the top wall, the cylindrical lens array is disposed in the opening of the closed hood, and the convex surface of the cylindrical lens array together with the top wall and the side wall of the closed hood forms the to-be-filled chamber.

Preferably, the liquid storage tank comprises a cylinder barrel, a piston and a piston rod, a first through hole is provided on the cylinder barrel, a second through hole connected with the first through hole is provided on the closed hood, the piston is disposed in the cylinder barrel, the transparent liquid can be stored in a cavity between the piston and the cylinder barrel, the piston rod being provided on the piston, and the transparent liquid can flow between the liquid storage tank and the to-be-filled chamber by operating the piston rod.

Preferably, the second through hole is provided on the side wall of the closed hood.

Preferably, the second through hole is provided at a lower part of the side wall of the closed hood, and the liquid storage tank is provided under the to-be-filled chamber so that the transparent liquid can flow into the liquid storage tank under the effect of its own gravity.

Preferably, the second though hole includes a second upper through hole and a second lower through hole, the liquid storage tank further includes an upper communicating pipe and a lower communicating pipe, the second upper through hole is located at an upper part of the side wall of the closed hood, the second lower through hole is located at a lower part of the side wall of the closed hood, the second upper through hole is connected with the first through hole via the upper communicating pipe, the second lower through hole is connected with the first through hole via the lower communicating pipe, and the liquid storage tank is provided under the to-be-filled chamber so that the transparent liquid can flow into the liquid storage tank under the effect of its own gravity.

Preferably, the side wall of the closed hood includes an upper wall, a lower wall, a left wall and a right wall, the left wall and the right wall connect the upper wall with the lower wall, both the left wall and the right wall are parallel to a length direction of the cylindrical lenses in the cylindrical lens array, the second upper through hole is provided at an uppermost part of the right wall, the second lower through hole is provided at a lowermost part of the right wall, the upper communicating pipe includes a horizontal pipe portion connected to the second upper through hole and arranged coaxially with the second upper through hole and a vertical pipe portion connected to the horizontal pipe portion, and the vertical pipe portion is connected to the first through hole.

Preferably, the first through hole includes a first upper through hole and a first lower through hole, the first upper through hole is provided on a top wall of the cylinder barrel, the first lower through hole is provided on a side wall of the cylinder barrel, the first lower through hole is connected to the second lower through hole via the lower communicating pipe, the first upper through hole is connected to the vertical pipe portion of the upper communicating pipe, and the piston can close the first lower through hole when the transparent liquid fills up the to-be-filled chamber.

Preferably, the first lower through hole is provided on the top of the side wall of the cylinder barrel, the piston comprises a horizontal portion and a vertical portion, the bottom of the horizontal portion of the piston is connected to the piston rod, the vertical portion of the piston extends upward from the horizontal portion of the piston to the top wall of the cylinder barrel, and the vertical portion of the piston can close the first lower through hole when the transparent liquid fills up the to-be-filled chamber.

Preferably, the cylindrical lens assembly comprises a driving member used for driving the piston rod to move and thus controlling the transparent liquid to flow out of or flow into the cylinder barrel, so that the transparent liquid fills up or is discharged from the to-be-filled chamber.

Preferably, the driving member includes a cam rotatably disposed under the piston rod, a lower end face of the piston rod is in contact with a surface of the cam, and the lower end face of the piston rod can slide relatively to the surface of the cam.

As another aspect of the present invention, a display device is provided, comprising a display panel, wherein the display device further comprises the cylindrical lens assembly provided by the present invention, and the cylindrical lens assembly is disposed on the display panel.

Preferably, the display device further comprises a backlight module, the display panel is a liquid crystal display panel, the backlight module is disposed on a light incident side of the display panel, the cylindrical lens assembly is disposed on a light emergent side of the liquid crystal display panel, or the cylindrical lens assembly is disposed between the backlight module and a light incident surface of the liquid crystal display panel.

Preferably, the width of each of the cylindrical lenses in the cylindrical lens array of the cylindrical lens assembly matches with the width of two columns of pixels or four columns of pixels of the display panel.

When it is required to perform flat panel display, the liquid storage tank may make transparent liquid fill up the to-be-filled chamber between the closed hood and the cylindrical lens array; and, when it is required to perform stereoscopic display, at least part of the transparent liquid in the to-be-filled chamber flows back to the liquid storage tank. It thus can be seen that, when a switchover between a flat panel display mode and a stereoscopic display mode of the display device is performed by using the cylindrical lens assembly provided by the present invention, it is only required to make the transparent liquid flow between the to-be-filled chamber and the liquid storage tank, without distorting the cylindrical lens array and applying a driving electric field, so the cylindrical lens assembly is easy to operate and implement, and has simple structure and low cost.

BRIEF DESCRIPTION OF THE DRAWINGS

The accompanying drawings are used for providing further understanding of the present invention, and constitute a part of the description. The accompanying drawings together with specific implementations hereinafter are used for explaining the present invention, but are not intended to limit the present invention. In the drawings.

REFERENCE NUMERALS 10. closed hood; 11. opening; 12. top wall; 13. side wall; 20. cylindrical lens array; 21. mounting surface; 22. convex surface; 30. liquid storage tank; 31. cylinder barrel; 32. piston; 33. piston rod; 34. upper communicating pipe; 35. lower communicating pipe; 40. display panel; 13a. second upper through hole; 13b. second lower through hole; 31a. first upper through hole; 31b. first lower through hole; 20a. cylindrical lens; 32a. horizontal portion of piston; 32b. vertical portion of piston; 34a. horizontal pipe portion; 34b. vertical pipe portion; 50. to-be-filled chamber; and 60. cam.

DETAILED DESCRIPTION OF THE INVENTION

Specific implementations of the present invention will be described as below in details with reference to the accompanying drawings. It should be understood that the specific implementations described herein are merely used for describing and explaining the present invention, but are not intended to limit the present invention.

As shown in FIGS. 1-3 and FIGS. 8-10, as one aspect of the present invention, a cylindrical lens assembly is provided, including a closed hood 10, a cylindrical lens array 20 and a liquid storage tank 30 for storing transparent liquid. A to-be-filled chamber 50 communicating with the liquid storage tank 30 is formed between the cylindrical lens array 20 and the closed hood 10. The transparent liquid in the liquid storage tank 30 may flow between the liquid storage tank 30 and the to-be-filled chamber 50, and may fill up the to-be-filled chamber 50. The refractive index of the transparent liquid in the liquid storage tank 30 is the same as that of the cylindrical lens array 20. The top of the closed hood 10 is made of a transparent material.

It should be understood that the "top" of the closed hood corresponds to a side facing an observer when in use.

The cylindrical lens assembly provided by the present invention may be disposed above a display panel, and is used cooperatively with the display panel to realize a switchover between flat panel display and stereoscopic display.

Specifically, when it is required to perform flat panel display, the liquid storage tank 30 may allow the transparent liquid stored therein to fill up the to-be-filled chamber 50; and, when it is required to perform stereoscopic display, the liquid storage tank 30 may allow at least part of the transparent liquid inside the to-be-filled chamber 50 to flow back to the liquid storage tank 30. The principles of flat panel display and stereoscopic display will be described as below in details and will not be redundantly described here.

It is easily understood that the transparent liquid is colorless, and light may enter the to-be-filled chamber 50 through the top of the closed hood 10.

In the present invention, the specific form of the cylindrical lens array 20 is not limited, as long as the cylindrical lens 20 may refract the light entering the cylindrical lens array 20 to change a propagating direction of the light and finally realize stereoscopic display. For example, the cylindrical lens array 20 may include a plurality of concave lenses arranged in parallel, or the cylindrical lens array 20 may include a plurality of convex lenses arranged in parallel. It should be understood that either the concave lenses or the convex lenses should be cylindrical.

In a specific implementation provided by the present invention, the cylindrical lens array 20 includes a plurality of convex lenses arranged in parallel (that is, cylindrical lenses 20a forming the cylindrical lens array 20 all are convex lenses). The orientations of convex surfaces of the plurality of convex lenses are consistent (all facing the hood top side 12 of the closed hood 10) to form a convex surface 22 of the cylindrical lens array 20, as shown in FIG. 8.

Similarly, the specific structure of the closed hood 10 will also not be specifically limited in the present invention, as long as the cylindrical lens array 20 may be accommodated therein and the to-be-filled chamber 50 may be formed therein. As a specific implementation of the present invention, as shown in FIG. 8, the closed hood 10 includes a transparent top wall 12, a side wall 13 connected to the top wall 12 (it is easily understood that the side wall 13 is formed around the top wall 12) and an opening 11 opposite to the top wall 12. The cylindrical lens array 20 is disposed in the opening 11 of the closed hood 10 (referring to FIG. 9 and FIG. 10), and the convex surface 22 of the cylindrical lens array 20 together with the top wall 12 and the side wall 13 of the closed hood 10 forms the to-be-filled chamber 50. It should be understood that the hood "top" wall refers to a wall facing an observer when in use, rather than a wall located on the top when in use.

Figure 8:
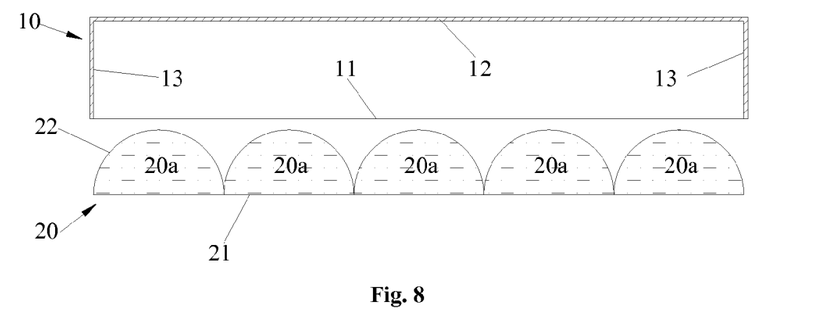
FIG. 8 is an exploded diagram of a closed hood and a cylindrical lens array in a cylindrical lens assembly according to an embodiment of the present invention.
Figure 9:
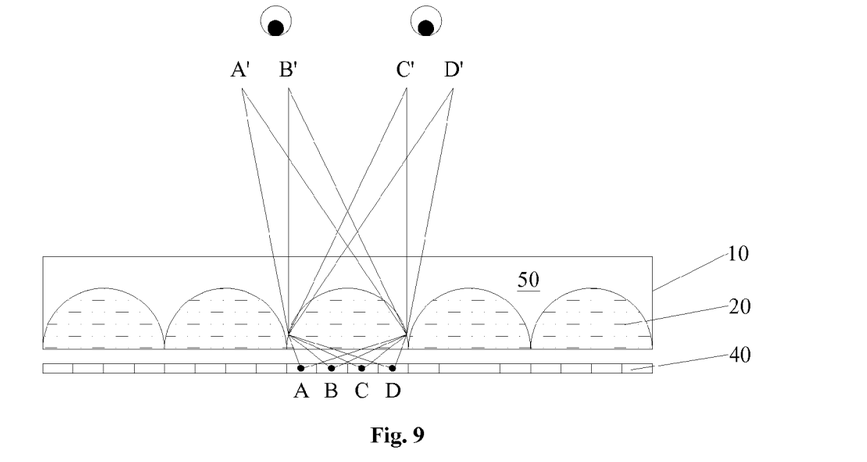

As shown in FIG. 8, the cylindrical lens array 20 includes a mounting surface 21 and the convex surface 22. The mounting surface 21 is roughly a plane, while the convex surface 22 protrudes from the mounting surface 21. The function of the mounting surface 21 is that the mounting surface 21 is opposite to a surface of a display panel when the cylindrical lens assembly and the display panel are assembled together. In the implementations as shown in FIG. 9 and FIG. 10, the mounting surface 21 of the cylindrical lens array 20 is opposite to a light emergent surface of a display panel 40.

In the present invention, the refractive index of the material forming the top wall 12 should be approximate to the refractive index of air. Thus, when the cylindrical lens assembly provided by the present invention is used cooperatively with a display panel, the refractive index of the top wall 12 may be ignored. In the present invention, the whole closed hood 10 may be designed to be colorless and transparent, and the refractive index at any place of the whole closed hood 10 is the same. Alternatively, the top wall 12 of the closed hood 10 may be designed to have a small thickness, so that the effect of changing light may be ignored.

The working principle of the cylindrical lens assembly provided by the present invention will be described as below with reference to FIG. 2, FIG. 3, FIG. 9 and FIG. 10. It is assumed that pixel A, pixel B, pixel C and pixel D on the display panel 40 correspond to four parallax images during stereoscopic display, respectively, but correspond to a same image during flat panel display. The working principle of the cylindrical lens assembly provided by the present invention will be described hereinafter according to two cases, i.e., flat panel display and stereoscopic display.

Figure 1:
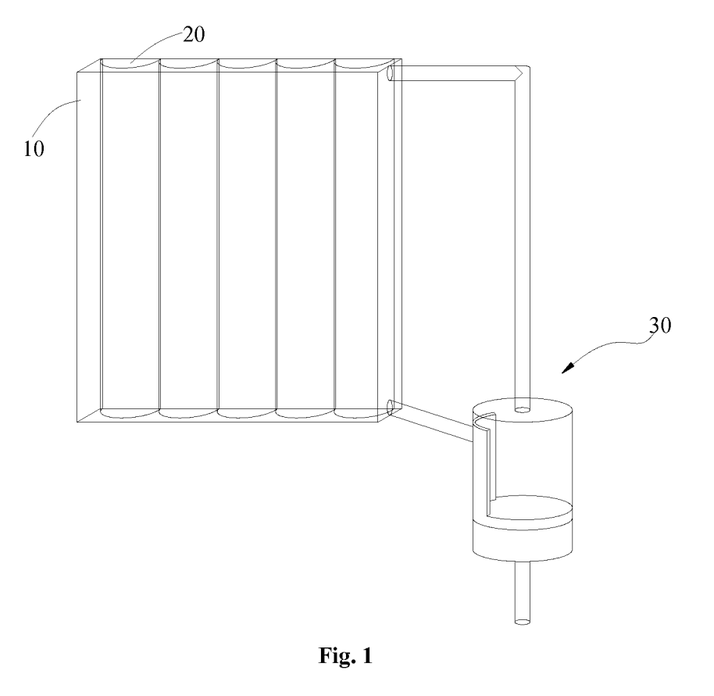
FIG. 1 is a stereoscopically schematic diagram of a cylindrical lens assembly according to an embodiment of the present invention.
Figure 2:
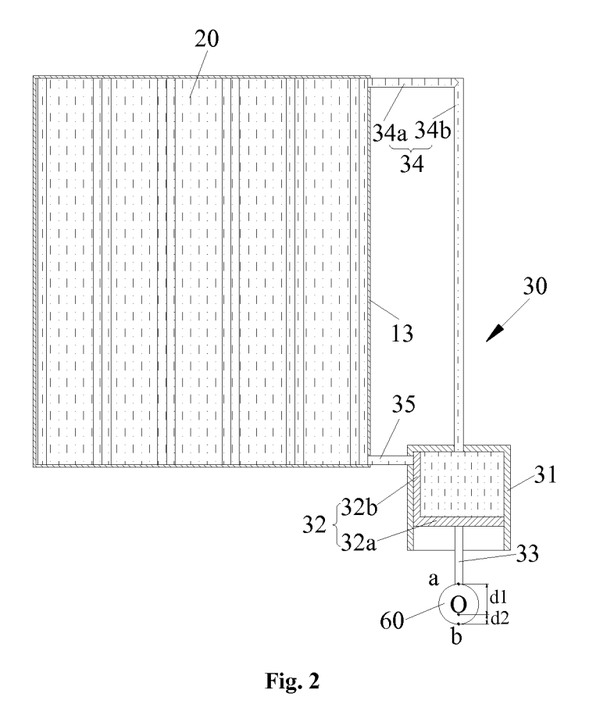
FIG. 2 and FIG. 10 are schematic diagrams when a to-be-filled chamber of the cylindrical lens assembly shown in FIG. 1 is filled up with transparent liquid.
Figure 10:
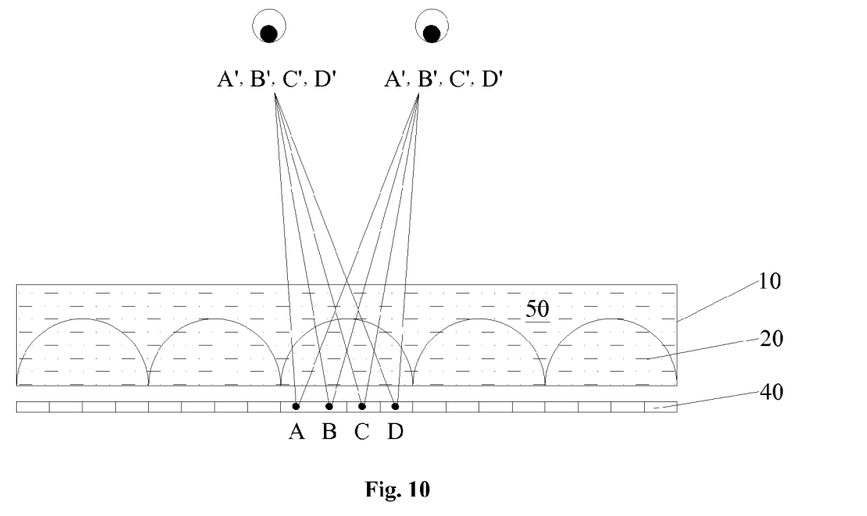

As shown in FIG. 2 and FIG. 10, when an observer needs flat panel display, the transparent liquid provided by the liquid storage tank 30 fills up the to-be-filled chamber 50. Light emitted from the display panel 40 enters into the cylindrical lens array 20 and then propagates to the to-be-filled chamber 50 filled up with the transparent liquid via the cylindrical lens array 20. As the refractive index of the transparent liquid is the same as that of the cylindrical lens array 20, so the propagating direction of the light keeps unchanged. Finally, the light passes through the top wall 12 of the closed hood 10 and may enter left and right eyes of the observer simultaneously. In this case, both the left and right eyes of the observer may see all images (including images corresponding to the pixel A, the pixel B, the pixel C and the pixel D) on the display panel 40 through the transparent liquid and the cylindrical lens array 20. At this time, the images sensed by the observer are flat images.

Figure 3:
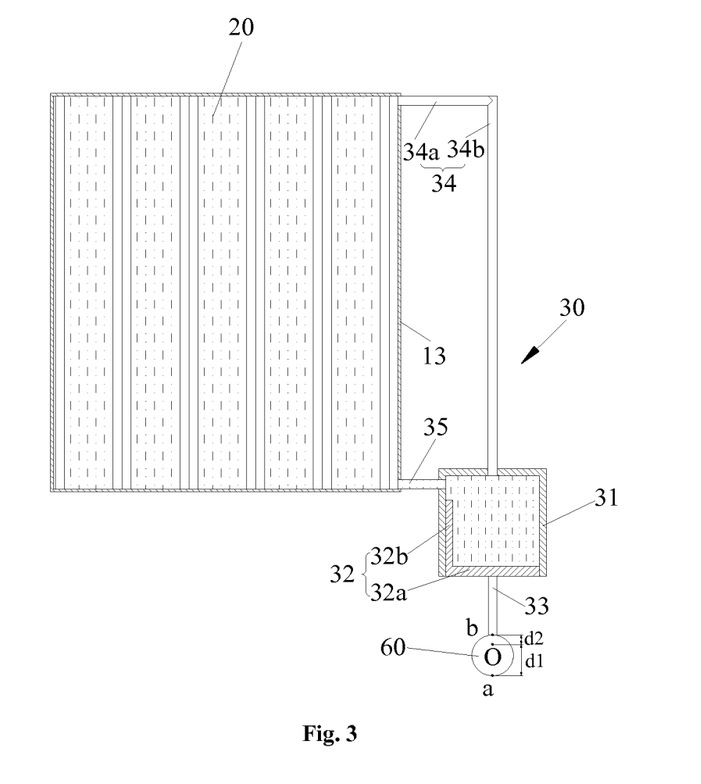
FIG. 3 and FIG. 9 are schematic diagrams when the transparent liquid is discharged from the to-be-filled chamber of the cylindrical lens assembly shown in FIG. 1.

As shown in FIG. 3 and FIG. 9, when an observer needs stereoscopic display, the liquid storage tank 30 may allow at least a part of the transparent liquid (in FIG. 9, all of the transparent liquid) in the to-be-filled chamber 50 to flow back to the liquid storage tank 30. As shown in FIG. 9, light emitted from a display panel 8 enters into the cylindrical lens array 20 and then propagates into air within the to-be-filled chamber 50 via the cylindrical lens array 20. As the refractive index of the air is different from that of the cylindrical lens array 20, so the propagating direction of the light is changed due to the refraction of the cylindrical lens array 20, and the light finally enters the eyes of the observer through the top wall 12 of the closed hood 10. After refracted by the cylindrical lens array 20, light emergent from the pixel A corresponds to a view point A', light emergent from the pixel B corresponds to a view point B', light emergent from the pixel C corresponds to a view point C', and light emergent from the pixel D corresponds to a view point D'. Therefore, images corresponding to the pixel A, the pixel B, the pixel C and the pixel D (that is, the four parallax images that respectively correspond to the four pixels) may be observed at the view point A', the view point B', the view point C' and the view point D', respectively. For example, as shown in FIG. 9, the left eye of the observer only sees one parallax image (corresponding to the pixel C), and the right eye only sees another parallax image (corresponding to the pixel B), so that the stereoscopic display effect is merged by the brain.

It can be seen that, when a switchover between a flat panel display mode and a stereoscopic display mode of a display device is performed by using the cylindrical lens assembly provided by the present invention, it is only required to allow the transparent liquid to flow between the to-be-filled chamber 50 and the liquid storage tank 30, without distorting the cylindrical lens array 20 and applying any driving eclectic field, so the cylindrical lens assembly is easy to operate and implement, and has simple structure and low cost.

In the present invention, the refractive index of the cylindrical lens array 20 may be about 1.5, and the refractive index of the transparent liquid is the same as that of the cylindrical lens array and is also about 1.5. It should be understood that, both the refractive index of the cylindrical lens assembly 20 and the refractive index of the transparent liquid are isotropic. In the present invention, the transparent liquid may be water or an organic solvent, and may also be water solution or organic solution containing a solute, or a mixture of a plurality of fluid substances. When the transparent liquid is water solution containing a solute, the transparent liquid may be metatungstate solution. By adjusting the concentration of the transparent liquid, the transparent liquid may have different refractive indexes. For example, the metatungstate solution may be cesium metatungstate solution. When the weight of water in the cesium metatungstate solution accounts for 30%, and the weight of cesium metatungstate accounts for 70%, the refractive index may reach 1.486. Or, the metatungstate solution may be ammonium metatungstate solution.

In the present invention, the specific structure of the liquid storage tank 30 is not specifically limited, as long as the liquid storage tank may store the transparent liquid and allow the transparent liquid to flow between the to-be-filled chamber 50 and the liquid storage tank 30. For example, the liquid storage tank 30 may include a storage container and a suction pump. The storage container is used for storing the transparent liquid, and the suction pump is used for driving the transparent liquid to flow between the to-be-filled chamber 50 and the storage container.

As an implementation of the present invention, as shown in FIG. 2, FIG. 3, FIG. 6 and FIG. 7, the liquid storage tank 30 may include a cylinder barrel 31, a piston 32 and a piston rod 33. A first through hole is provided on the cylinder barrel 31, while a second through hole connected with the first through hole is provided on the closed hood 10. The piston 32 is disposed in the cylinder barrel 31. The transparent liquid may be stored in a cavity between the piston 32 and the cylinder barrel 31. The piston rod 33 is provided on the piston 32. The transparent liquid may flow between the liquid storage tank 30 and the to-be-filled chamber 50 by operating the piston rod 33. In the present invention, the first through hole and the second through hole are connected via conduits, specifically referring to the detailed description hereinafter.

When it is required to perform flat panel display, the piston rod 33 is pushed upward, so that the piston 32 drives the transparent liquid to flow, and the transparent liquid enters into the to-be-filled chamber 50 through the first through hole and the second through hole. When it is required to perform stereoscopic display, the piston rod 33 is pulled downward, so that the transparent liquid within the to-be-filled chamber 50 flows from the to-be-filled chamber 50 back to the cylinder barrel 31. It is only required to push the piston rod upward or pull the piston rod downward during a switchover, so arranging the liquid storage tank 30 as the above structure may reduce the noise generated during the switchover between the flat panel display mode and the stereoscopic display mode, and may reduce energy consumption during the switchover between the flat panel display mode and the stereoscopic display mode.

As described above, the closed hood 10 may include a side wall 13 arranged around the top wall 12. When in use, the top wall 12 faces the observer. To not influence the observer to view images displayed by the display panel 40 in the processes of filling transparent liquid into the to-be-filled chamber 50 and pumping the transparent liquid back to the liquid storage tank 30, preferably, the second through hole may be provided on the side wall 13.

In the present invention, the number of the second through hole is not limited specifically. For example, there may be one second through hole, and the liquid storage tank 30 includes one first through hole corresponding to the second through hole.

To make the transparent liquid all flow back to the liquid storage tank 30 during the realization of stereoscopic display, preferably, the second through hole may be provided at a lower part of the side wall 13, and the liquid storage tank 30 is disposed under the closed hood 10. It should be noted that the direction "lower" herein refers to a direction "lower" as shown in FIGS. 2-7. When a switchover between flat panel display and stereoscopic display is realized by using the cylindrical lens assembly provided by the present invention, the cylindrical lens assembly is disposed on a light emergent side of the display panel, and the top wall 12 of the closed hood 10 faces the observer. To better realize stereoscopic display, it is required to drain the transparent liquid within the to-be-filled chamber 50. As the second through hole is provided at the lower part of the side wall 13, the transparent liquid may flow downward under the effect of its gravity and then flow into the liquid storage tank 30 through the second through hole when it is required to drain the transparent liquid within the to-be-filled chamber 50.

Figure 4:
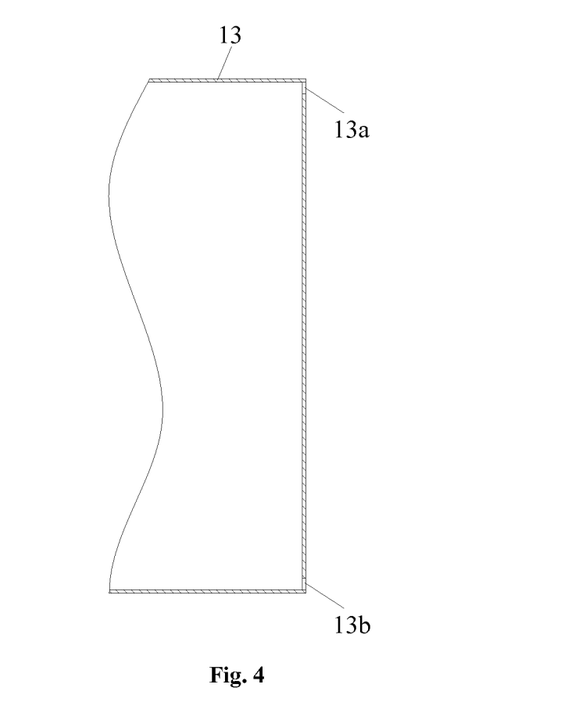
FIG. 4 is a partially schematic diagram of a closed hood of a cylindrical lens assembly according to an embodiment of the present invention, where a second upper through hole and a second lower through hole disposed on a right wall of a side wall are shown.

Alternatively, as shown in FIG. 4, the second through hole may include a second upper through hole 13a and a second lower through hole 13b. The second upper through hole 13a is located at an upper part of the side wall 13, while the second lower through hole 13b is located at a lower part of the side wall 13. The liquid storage tank 30 further includes an upper communicating pipe 34 and a lower communicating pipe 35 (as shown in FIG. 2 and FIG. 3). The second upper through hole 13a is connected to the first through hole via the upper communicating pipe 34, while the second lower through hole 13b is connected to the first through hole via the lower communicating pipe 35. The liquid storage tank 30 is provided under the to-be-filled chamber 10. It should be understood that, the directions "upper and lower" used herein are still directions "upper and lower" in a use state of the cylindrical lens assembly, i.e., directions "upper and lower" as shown in FIGS. 2-4.

The arrangement of the second upper through hole 13a at the upper part of the side wall 13 may ensure that the transparent liquid fills up the to-be-filled chamber 50, while the arrangement of the second lower through hole 13b at the lower part of the side wall 13 may ensure that the transparent liquid within the to-be-filled chamber 50 is completely discharged.

As described above, the side wall 13 is arranged around the top wall 12, as show in FIG. 2 and FIG. 3, so the side wall 13 includes an upper wall, a lower wall, a left wall and a right wall. The left wall and the right wall connect the upper wall with the lower wall. Preferably, both the left wall and the right all are parallel to a length direction of the cylindrical lenses in the cylindrical lens array. It should be understood that the directions "upper, lower, left and right" used herein refer to directions "upper, lower, left and right" as shown in FIG. 2 and FIG. 3, respectively. To facilitate arrangement of the upper communicating pipe 34 and the lower communicating pipe 35, preferably, both the first upper through hole 13a and the second lower through hole 13b may be provided on the left wall of the side wall 13, or may be provided on the right wall of the side wall 13.

Further, preferably, the second upper through hole 13a may be provided in an uppermost part of the right wall of the side wall 13, the upper communicating pipe 34 includes a horizontal pipe portion 34a arranged coaxially with the second upper through hole 13a (that is, when the horizontal pipe portion 34a is connected to the second upper through hole 13a, the second upper through hole 13a is coaxial with the horizontal pipe portion 34a) and a vertical pipe portion 34b connected to the horizontal pipe portion 34a, and the vertical pipe portion 34b is connected to the first through hole. In this case, the second lower through hole 13b is also provided on the right wall. It should be understood that, although both the second upper through 13a and the second lower through hole 13b are provided on the right wall in this implementation, yet the arrangement positions of the second upper through hole 13a and the second lower through hole 13b are not limited thereto, and the second upper through hole 13a and the second lower through hole 13b may also be simultaneously provided on the left wall of the side wall 13.

As the second upper through hole 13a is provided at the uppermost part of the right wall of the side wall 13, the liquid level in the second upper through hole 13a is the same as that of the horizontal pipe portion 34a according to the principle of a communicating pipe. When the second lower through hole 13b is closed, the transparent liquid will not flow from the second upper through hole 13a to the horizontal pipe portion 34a. Therefore, the purpose of the arrangement of the horizontal pipe portion 34a is to prevent the transparent liquid from flowing out from the second upper through hole 13a when the transparent liquid fills up the to-be-filled chamber 50. The purpose of the arrangement of the vertical pipe portion 34b is to reduce the installation space occupied by the cylindrical lens assembly, so that the whole volume of a display device using the cylindrical lens assembly provided by the present invention may be reduced.

To facilitate stereoscopic display, the transparent liquid in the to-be-filled chamber 50 is discharged completely. Preferably, the second lower through hole 13b may be provided at a lowermost part of the side wall 13.

Figure 5:
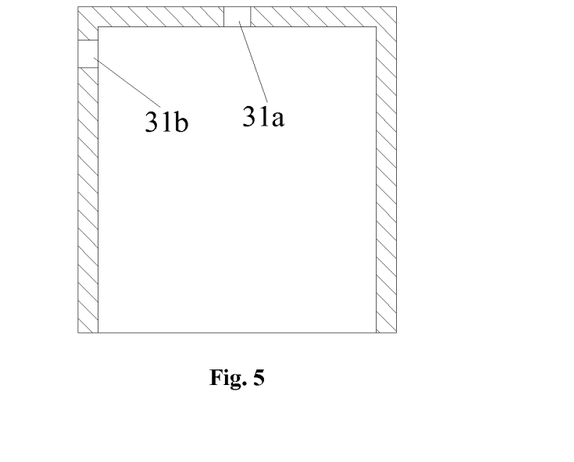
FIG. 5 is a schematic diagram of a cylinder barrel in a driving device of a cylindrical lens assembly according to an embodiment of the present invention, where a first upper through hole and a first lower through hole disposed on a top wall of the cylinder barrel and a side wall of the cylinder barrel, respectively, are shown.
Figure 6:
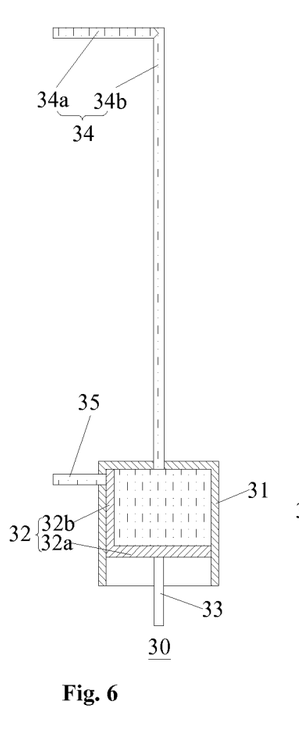
FIG. 6 is a schematic diagram of a liquid storage tank when the to-be-filled chamber of the cylindrical lens assembly shown in FIG. 1 is filled up with the transparent liquid.
Figure 7:
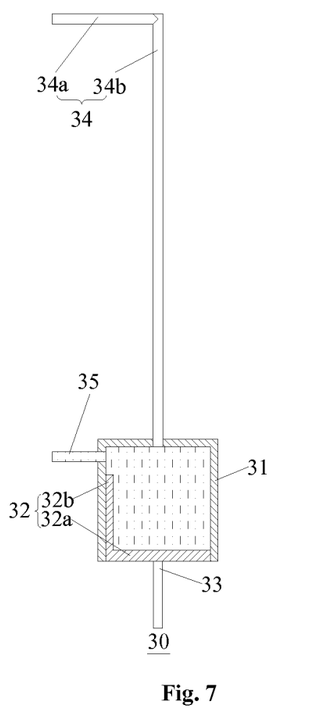
FIG. 7 is a schematic diagram of the liquid storage tank when the transparent liquid is discharged from the to-be-filled chamber of the cylindrical lens assembly shown in FIG. 1.

As shown in FIG. 5, the first through hole may include a first upper through hole 31a and a first lower through hole 31b, the first upper through hole 31a is provided on a top wall of the cylinder barrel 31, and the first lower through hole 31b is provided on a side wall of the cylinder barrel 31. As shown in FIG. 2 and FIG. 3, the first upper through hole 31a is connected to the second upper through hole via the upper communicating pipe 34, the first lower through hole 31b is connected to the second lower through hole via the lower communicating pipe 35, and the first upper through hole 31a is connected to the vertical pipe portion 34b of the upper communicating pipe 34. When the transparent liquid fills up the to-be-filled chamber 50 (this case corresponds to flat panel display), the first lower through hole 31b may be closed by the piston 32.

The advantage of closing the first lower through hole 31b by the piston 32 lies in that the transparent liquid in the to-be-filled chamber 50 may be prevented from flowing back to the liquid storage tank 30 when the transparent liquid fills up the to-be-filled chamber 50. Specifically, as the second upper through hole 13a is level with the horizontal pipe portion 34a of the upper communicating pipe 34, the transparent liquid will not flow back to the liquid storage tank 30 through the second upper through hole 13a. The first lower through hole 31b is closed, so the transparent liquid will not flow back to the liquid storage tank 30 through the first lower through hole 31b, so that the display device may have a stable flat panel display effect.

In the present invention, the specific structure of the piston 32 is not limited specifically, as long as the piston 32 may drive the transparent liquid to flow and may close the first lower through hole 31b during flat panel display. As an implementation of the present invention, as shown in FIGS. 2-5, the piston 32 may include a horizontal portion 32a and a vertical portion 32b, the bottom of the horizontal portion 32a is connected to the piston rod 33, and the vertical portion 32b extends from the horizontal portion 32a toward the top wall of the cylinder barrel 31. When the transparent liquid fills up the to-be-filed chamber 50, the vertical portion 32b moves upward to contact the top wall of the cylinder barrel 31, so that the first lower through hole 31b may be closed.

In the present invention, the first lower through hole 31b is usually provided on the top of the side wall of the cylinder barrel 31, i.e., at a position close to the top wall of the cylinder barrel 31, so that the transparent liquid in the liquid storage tank 30 may be prevented from flowing back to the to-be-filled chamber 50 when it is required to perform stereoscopic display. The advantage of the arrangement of the piston 32 including the vertical portion 32b and the horizontal portion 32a also lies in that the horizontal portion 32a still remains a certain distance from the top wall of the cylinder barrel 31 when the vertical portion 32b closes the first lower through hole 31b, so that the horizontal portion 32a will not knock the top wall of the cylinder barrel 31 and thus will not damage the top wall of the cylinder barrel 31.

As an implementation of the present invention, as shown in FIG. 1, FIG. 8 to FIG. 10, the cylindrical lens array 20 may include a plurality of cylindrical lenses 20a arranged in parallel (i.e. parallel arrangement). The bottom surfaces of the plurality of cylindrical lenses 20a form a mounting surface 21.

To make the effect of stereoscopic display more stable, further, as shown in FIG. 8, the width of the bottom surface of each of the cylindrical lenses 2a (the direction of the width here refers to a direction from left to right in FIG. 8) is larger than the width of each column of pixels of the display panel 40 in coordination with the cylindrical lens assembly. Preferably, the width of each of the cylindrical lenses 2a is equivalent to the width of two columns of pixels of the cooperatively used display panel. When the display panel displays stereoscopic images, the two columns of pixels display a left-eye image and a right-eye image, respectively. As each of the cylindrical lenses 20a corresponds to two columns of pixels, the directions of light emergent from two columns of pixels may be changed by the cylindrical lenses 20a during stereoscopic display, and the images displayed by the two columns of pixels enter the left and right eyes of an observer, respectively, so as to realize the stereoscopic display effect. Each of the cylindrical lenses 20a may also be corresponding to four columns of pixels for displaying four parallax images, respectively, as shown in FIG. 9.

Preferably, the cylindrical lens assembly further includes a driving member used for driving the piston rod 33 to move up and down in a vertical direction thus controlling the transparent liquid to flow out of or flow into the cylinder barrel 31, so that the transparent liquid fills up or is discharged from the to-be-filled chamber 50.

In the present invention, the specific structure of the driving member is not limited specifically, as long as the driving member may drive the piston rod 33 to move up and down in the vertical direction. For example, the driving member may include a gear and gear rack driving mechanism. Preferably, as shown in FIG. 2 and FIG. 3, the driving member may include a cam 60 which is rotatably provided under the piston rod 33, and a lower end face of the piston rod 33 is in contact with the surface of the cam 60. It should be noted that the lower end face of the piston rod 33 may slide relatively to the surface of the cam 60.

The person skilled in the art should understand that a distance from each point on the outer surface of the cam 60 to a center of rotation of the cam 60 is not equal everywhere, so the piston rod 33 may move upward or downward with the rotation of the cam 60.

As shown in FIG. 2 and FIG. 3, in the implementation provided by the present invention, the center of rotation of the cam 60 is O, a point a is the one on the outer surface of the cam 60 farthest away from the center O of rotation, wherein the distance from the point a to the center O of rotation is d1, and a point b is the one on the outer surface of the cam 60 closest to the center O of rotation, wherein the distance from the point b to the center O of rotation is d2 (d2>d1).

As shown in FIG. 2, when it is required to perform flat panel display, the point a on the outer surface of the cam 60 farthest away from the center O of rotation of the cam 60 is in contact with the bottom of the piston rod 33, so that the piston 32 is located at a highest position. At this position, the vertical portion 32b closes the first lower through hole 31b, and at the moment, the transparent liquid in the cylinder barrel 31 fills up the to-be-filled chamber 50. To remain the flat panel display state, the cam 60 is remained in this state (that is, the point a on the outer surface of the cam 60 farthest away from the center O of rotation of the cam 60 is remained to be in contact with the bottom of the piston rod 33), so that the cam 60 supports the piston rod 33 and thus prevents the piston 32 from moving downward.

When it is required to switch to stereoscopic display, the cam 60 is rotated to make the point a move downward, the piston rod 33 moves downward due to its gravity and the gravity of the transparent liquid in the cylinder barrel 31, and the transparent liquid flows back to the cylinder barrel 31. The cam 60 continues to be rotated until the point b on the outer surface of the cam 60 closest to the center of rotation of the cam 60 is in contact with the bottom of the piston rod 33 so as to make the piston 32 located at the lowest position (as shown FIG. 3), so that at the moment, at least part of the transparent liquid in the to-be-filled chamber 50 flows back to the cylinder barrel 31. To remain the stereoscopic display state, the cam 60 is remained at this state (that is, the point b on the outer surface of the cam 60 closest to the center O of rotation of the cam 60 is remained to be in contact with the bottom of the piston rod 33), so that the cam 60 supports the piston rod 33 and thus prevents the piston rod 33 from moving.

When the piston rod 33 moves downward, it relies on the gravity of the piston 32 and the gravity of the transparent liquid in the cylinder barrel 31, without other external forces, so that electric energy is saved. Meanwhile, the cam 60 may be driven to rotate by a driving element such as a motor. The driving member including the cam 60 is simple in structure, so that the installation space may be saved and the overall size of the cylindrical lens assembly is reduced.

As shown in FIG. 9 and FIG. 10, as another aspect of the present invention, a display device is provided. The display device includes a display panel 40, wherein the display device further includes the above-mentioned cylindrical lens assembly provided by the present invention and the cylindrical lens assembly is provided on the display panel 40.

It should be noted that the "the cylindrical lens assembly being provided on the display panel" described herein does not mean that the cylindrical lens assembly is provided above the display panel, but means that the cylindrical lens assembly is used cooperatively with the display panel 40, and light incident into the display panel 40 or emergent from the display panel 40 may pass through the cylindrical lens assembly.

In the present invention, the position of the cylindrical lens assembly in the display device is not limited specifically. For example, the mounting surface 21 of the cylindrical lens assembly may be disposed on a light emergent side of the display panel 40. For another example, when the display panel 40 is a liquid crystal display panel, the display device further includes a backlight module, and the cylindrical lens assembly may be disposed on the light emergent side of the display panel 40 or may be disposed between the backlight module and a light incident surface of the display panel.

Whether the cylindrical lens assembly is disposed on one side of the display panel 40 facing an observer or on one side of the display panel opposing to the observer is determined according to the specific form of the display panel 40.

Preferably, the length direction of each of the cylindrical lenses 20a in the cylindrical lens array 20 is consistent with a height (the "height" direction described herein refers to "upper and lower" directions in FIG. 2 and FIG. 3) direction of a display region of the display panel in the display device. Preferably, the width of each of the cylindrical lenses 20a of the cylindrical lens array 20 of the cylindrical lens assembly matches with the width of two columns of pixels of the display panel 40. Preferably, the width of each of the cylindrical lenses 20a of the cylindrical lens array 20 of the cylindrical lens assembly matches with the width of four columns of pixels of the display panel 40.

The display device provided by the present invention may realize a switchover of 2D/3D. When the to-be-filed chamber 50 in the cylindrical lens assembly is filled up with the transparent liquid, the display device realizes 2D display (i.e., flat panel display); and, when at least part of the transparent liquid in the to-be-filled chamber 50 in the cylindrical lens assembly is discharged, the display device realizes 3D display (i.e., stereoscopic display).

It is easily understood that the stereoscopic display effect of the display device provided by the present invention is a naked-eye 3D effect.

The cylindrical lens assembly for realizing a switchover between flat panel display and stereoscopic display may be disposed in a housing of the display device.

When a switchover between a flat panel display mode and a stereoscopic display mode of the display device is performed by using the cylindrical lens assembly provided by the present invention, it is only required to make the transparent liquid flow between the to-be-filled chamber 50 and the liquid storage tank 30, without distorting the cylindrical lens array and applying a driving electric field, so the cylindrical lens assembly is easy to operate and implement, and has simple structure and low cost.

It should be understood that the foregoing implementations are merely exemplary implementations used for explaining the principle of the present invention, but the present invention is not limited thereto. The person of ordinary skill in the art may make various variations and improvements without departing from the spirit and essence of the present invention, and these deformations and improvements are interpreted as falling into the protection scope of the present invention.

The invention claimed is:

1. A cylindrical lens assembly, comprising a cylindrical lens array, a closed hood and a liquid storage tank, wherein
a to-be-filled chamber is formed between the cylindrical lens array and the closed hood, the to-be-filled chamber is connected with the liquid storage tank used for storing transparent liquid, the refractive index of the transparent liquid is the same as that of the cylindrical lens array, the transparent liquid is capable of flowing between the liquid storage tank and the to-be-filled chamber and capable of filling up the to-be-filled chamber, and the top of the closed hood is made of a transparent material,
the liquid storage tank comprises a cylinder barrel, a piston and a piston rod, a first through hole is provided on the cylinder barrel, a second through hole is provided on the closed hood, the first through hole comprises a first upper through hole and a first lower through hole, the second though hole comprises a second upper through hole and a second lower through hole, the liquid storage tank further comprises an upper communicating pipe and a lower communicating pipe, the second upper through hole is connected to the first upper through hole via the upper communicating pipe, the second lower through hole is connected to the first lower through hole via the lower communicating pipe, the piston is disposed in the cylinder barrel, the transparent liquid is storable in a cavity between the piston and the cylinder barrel, the piston rod is provided on the piston, and the transparent liquid is driven to flow between the liquid storage tank and the to-be-filled chamber by operating the piston rod, and the piston is configured to close the first lower through hole when the to-be-filled chamber is filled up with the transparent liquid.

2. The cylindrical lens assembly according to claim 1, wherein the cylindrical lens array comprises a plurality of convex lenses arranged in parallel, the orientations of convex surfaces of the plurality of convex lenses are consistent to form a convex surface of the cylindrical lens array, the closed hood comprises a transparent top wall, a side wall connected to the top wall and an opening opposite to the top wall, the cylindrical lens array is disposed in the opening of the closed hood, and the convex surface of the cylindrical lens array together with the top wall and the side wall of the closed hood forms the to-be-filled chamber.

3. The cylindrical lens assembly according to claim 2, wherein the second upper through hole is located at an upper part of the side wall of the closed hood, the second lower through hole is located at a lower part of the side wall of the closed hood, and the liquid storage tank is provided under the to-be-filled chamber so that the transparent liquid is capable of flowing into the liquid storage tank under the effect of its own gravity.

4. The cylindrical lens assembly according to claim 3, wherein the side wall of the closed hood comprises an upper wall, a lower wall, a left wall and a right wall, the left wall and the right wall connect the upper wall with the lower wall, both the left wall and the right wall are parallel to a length direction of the cylindrical lenses in the cylindrical lens array, the second upper through hole is provided at an uppermost part of the right wall, the second lower through hole is provided at a lowermost part of the right wall, the upper communicating pipe comprises a horizontal pipe portion connected to the second upper through hole and arranged coaxially with the second upper through hole and a vertical pipe portion connected to the horizontal pipe portion, and the vertical pipe portion is connected to the first through hole.

5. The cylindrical lens assembly according to claim 4, wherein the first upper through hole is provided on a top wall of the cylinder barrel, the first lower through hole is provided on a side wall of the cylinder barrel, the first upper through hole is connected to the vertical pipe portion of the upper communicating pipe.

6. The cylindrical lens assembly according to claim 5, wherein the first lower through hole is provided on the top of the side wall of the cylinder barrel, the piston comprises a horizontal portion and a vertical portion, the bottom of the horizontal portion of the piston is connected to the piston rod, the vertical portion of the piston extends from the horizontal portion of the piston toward the top wall of the cylinder barrel, and the vertical portion of the piston is able to close the first lower through hole when the transparent liquid fills up the to-be-filled chamber.

7. The cylindrical lens assembly according to claim 1, wherein the cylindrical lens assembly comprises a driving member used for driving the piston rod to move and thus controlling the transparent liquid to flow out of or flow into the cylinder barrel, so that the transparent liquid fills up or is discharged from the to-be-filled chamber.

8. The cylindrical lens assembly according to claim 7, wherein the driving member comprises a cam rotatably disposed under the piston rod, a lower end face of the piston rod is in contact with a surface of the cam, and the lower end face of the piston rod is capable of sliding relatively to the surface of the cam.

9. A display device, comprising a display panel, wherein the display device further comprises the cylindrical lens assembly according to claim 1, and the cylindrical lens assembly is disposed on the display panel.

10. The display device according to claim 9, wherein the display device further comprises a backlight module, the display panel is a liquid crystal display panel, the backlight module is disposed on a light incident side of the display panel, the cylindrical lens assembly is disposed on a light emergent side of the liquid crystal display panel, or the cylindrical lens assembly is disposed between the backlight module and a light incident surface of the liquid crystal display panel.

11. The display device according to claim 9, wherein the cylindrical lens array comprises a plurality of convex lenses arranged in parallel, the orientations of convex surfaces of the plurality of convex lenses are consistent to form a convex surface of the cylindrical lens array, the closed hood comprises a transparent top wall, a side wall connected to the top wall and an opening opposite to the top wall, the cylindrical lens array is disposed in the opening of the closed hood, and the convex surface of the cylindrical lens array together with the top wall and the side wall of the closed hood forms the to-be-filled chamber.

12. The display device according to claim 11, wherein the width of each of the cylindrical lenses in the cylindrical lens array of the cylindrical lens assembly matches with the width of two or four columns of pixels of the display panel.

13. The display device according to claim 9, wherein the cylindrical lens assembly comprises a driving member used for driving the piston rod to move and thus controlling the transparent liquid to flow out of or flow into the cylinder barrel, so that the transparent liquid fills up or is discharged from the to-be-filled chamber.

14. The display device according to claim 13, wherein the driving member comprises a cam rotatably disposed under the piston rod, a lower end face of the piston rod is in contact with a surface of the cam, and the lower end face of the piston rod is capable of sliding relatively to the surface of the cam.

* * * * *